United States Patent [19]

Snodgrass

[11] Patent Number: 5,335,248
[45] Date of Patent: Aug. 2, 1994

[54] APPARATUS FOR CORRELATING MULTI-FREQUENCY SIGNALS

[75] Inventor: Timothy E. Snodgrass, Palo, Iowa

[73] Assignee: Rockwell International Corporation, Seal Beach, Calif.

[21] Appl. No.: 79,308

[22] Filed: Jun. 17, 1993

[51] Int. Cl.⁵ ............................................. G06F 15/336
[52] U.S. Cl. .................................. 375/1; 364/728.07; 364/728.03
[58] Field of Search ............... 375/1; 364/728, 728.07, 364/728.03

[56] References Cited

U.S. PATENT DOCUMENTS

| | | | |
|---|---|---|---|
| 4,209,834 | 6/1980 | Rabow | 375/1 |
| 4,267,592 | 5/1981 | Craiglow | 375/1 |
| 4,335,463 | 6/1982 | Foucard | 375/1 |
| 4,404,645 | 9/1983 | Elings et al. | 364/728 |
| 4,435,821 | 3/1984 | Ito et al. | 375/1 |
| 4,562,312 | 12/1985 | Duttweiler | 179/170.2 |
| 4,672,658 | 6/1987 | Kavehrad et al. | 375/1 |
| 4,791,599 | 12/1988 | Hethuin et al. | 364/728.07 |
| 4,817,014 | 3/1989 | Schneider et al. | 364/728.03 |
| 4,875,221 | 10/1989 | Mori | 375/1 |
| 5,031,192 | 7/1991 | Clark | 375/1 |
| 5,090,024 | 2/1992 | Vander Mey et al. | 375/1 |
| 5,103,417 | 4/1992 | Halliday | 364/728.03 |
| 5,144,640 | 9/1992 | Yamamoto | 375/1 |
| 5,177,765 | 1/1993 | Holland et al. | 375/1 |
| 5,179,571 | 1/1993 | Schilling | 375/1 |
| 5,228,055 | 7/1993 | Uchida et al. | 375/1 |

*Primary Examiner*—David C. Cain
*Attorney, Agent, or Firm*—Kyle Eppele; M. Lee Murrah; H. Fredrick Hamann

[57] ABSTRACT

An apparatus and method of processing transmitted signals through the use of correlator means and RAM means thereby accomplishing synchronization and data interpretation. Specifically, a plurality of correlators are coupled to RAM means which cooperate to store and subsequently read transmitted data. Clocking means used in conjunction with a programmed delay period provides segments of the received and stored data to a plurality of correlators and on to logic means for further processing.

10 Claims, 4 Drawing Sheets

APPARATUS FOR CORRELATING MULTI-FREQUENCY SIGNALS

BACKGROUND OF THE INVENTION

The invention relates to correlators and more specifically to correlators which include and comprise processing capability of received signals through the use of Random Access Memory (RAM) means.

Spread spectrum communications involve using more bandwidth than is theoretically needed to transmit digital data. Motivation for using spread spectrum signals is generally based on interference suppression, energy density reduction and/or time delay measurement. Direct sequence, pseudonoise, frequency hopping, time hopping and linear frequency modulation are generic types of spread spectrum signals which may be used alone or in combination with each other dependent upon user requirements and system capacity.

A matched filter, typically a correlator, provides at its output the maximum possible peak-signal power/average-noise power ratio when the input is a known signal and a random noise component. Matched filters are implemented in a variety of elements and may be periodic, non-periodic, autocorrelated or cross correlated. Traditional implementations require dedicated circuitry for each correlator and associated devices in a multi-frequency application. Alternatively, some single frequency implementations have utilized memory devices in a limited fashion to provide code correlation.

There currently exists a need for implementing correlator functions using minimum circuitry and elements that have maximum application flexibility.

SUMMARY OF THE INVENTION

The present invention contemplates an apparatus and method of processing transmitted signals through the use of correlator means and RAM means thereby accomplishing synchronization and data interpretation. Specifically, a plurality of correlators are coupled to RAM means which cooperate to store and subsequently read or decode transmitted data. A clocking means used in conjunction with a programmed delay period provides segments of the received and stored data to a plurality of correlators and on to logic means for further processing.

One embodiment of the present invention is implemented in a multi-frequency receiver that processes four received frequencies, such as one-half of a Joint Tactical Information Display System (JTIDS) receiver, each frequency processed by a RAM means coupled to four correlators. The RAM means may include a gating function coupled to its input port thereby enabling operation at a slower speed, consistent with commercially available gate-array integrated circuit devices.

It is therefore an object of the present invention to provide an apparatus and method for optimizing spread spectrum receiver processing.

It is a feature of the present invention to utilize RAM means for processing received signals.

It is an advantage of the present invention to provide a low cost, highly efficient processing means as contrasted to currently known techniques.

These and other objects, features and advantages are disclosed and claimed in the specification, figures and claims of the present application.

DETAILED DESCRIPTION OF THE DRAWINGS

Figure 1:
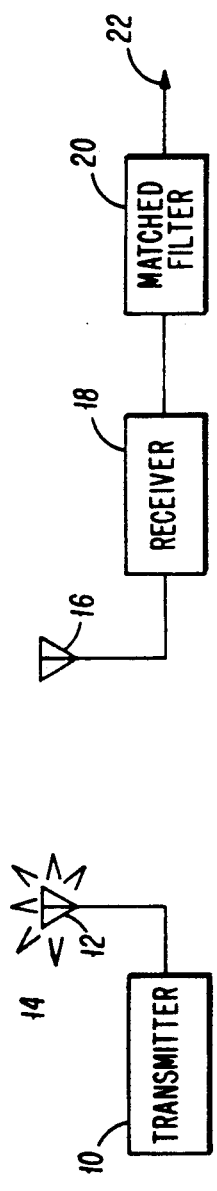
FIG. 1 is a block diagram of a portion of a communication system incorporating the teachings of the present invention.

Referring now to the drawings wherein like items are referenced as such throughout, FIG. 1 illustrates a block diagram of certain portions of a communication system incorporating the teachings of the present invention. A transmitter 10 coupled to antenna means 12 produces a plurality of signals 14. It is understood that the transmitter 10 is capable of transmitting on multiple frequencies $f_1$ through $f_n$. Second antenna means 16 detects the transmitted signals 14 and routes such signals to a receiver 18. It is equally understood that the receiver depicted by block 18 is capable of receiving multi-frequency signals such as the signals 14 generated by the transmitter 10. Matched filter means 20 are coupled to the receiver 18 and provide code synchronization capability and data processing of the signals 14 by incorporating the teachings of the present invention, hereafter described in detail. Matched filter means 20 has its output 22 coupled to additional processing means (not shown) for subsequent manipulation of the received signal 14 information.

Figure 2:
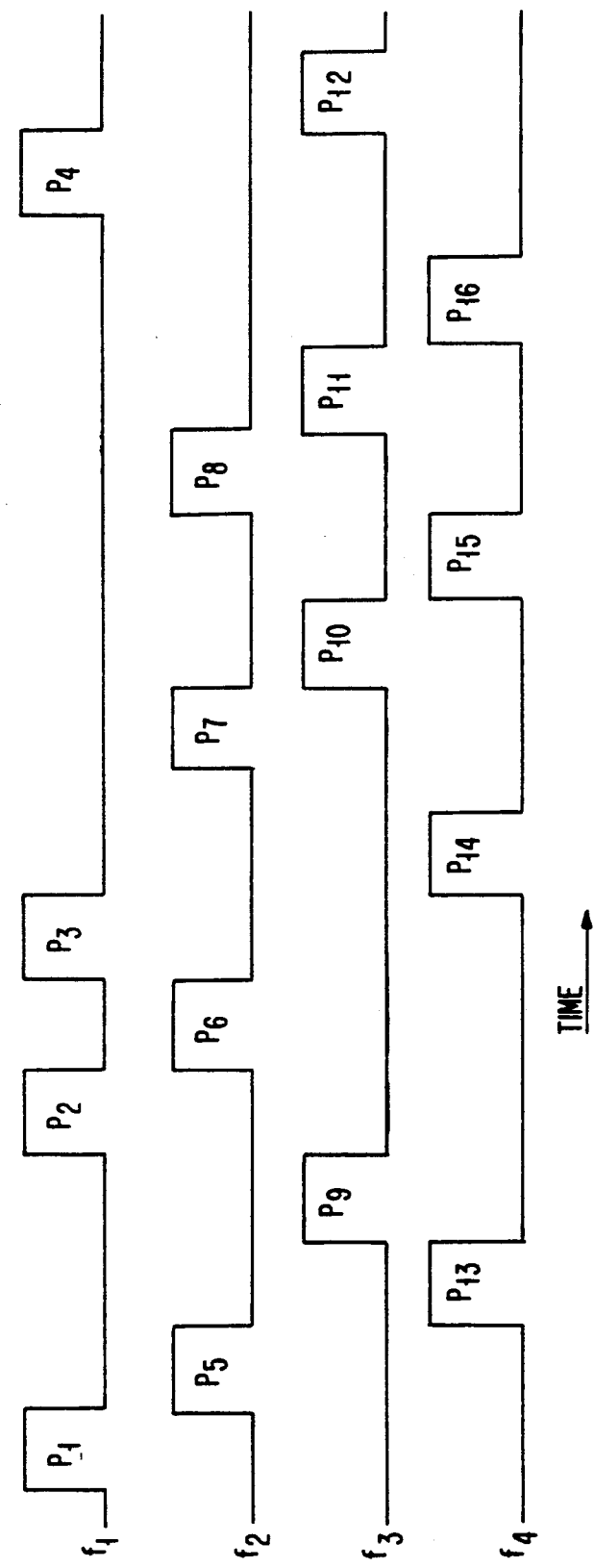
FIG. 2 is a timing diagram of sample transmitted data of the system of FIG. 1.

FIG. 2 depicts a timing diagram for a multi-frequency transmitted message such as the signal 14 of FIG. 1. Time delayed pulsed information, represented as $P_1$ through $P_{16}$ is transmitted over four frequencies, $f_1$ through $f_4$. The use of four pulses on four frequencies is for illustration purposes only and is not a limitation on the teachings of the present invention. The pulsed information of FIG. 2 represents one half of the signal transmitted in a system employing the concepts of the JTIDS, particularly well suited for illustrating Applicant's invention.

In order to decode the information transmitted in pulses, $P_1$ through $P_{16}$, the receiver and matched filter synchronize the various pulses and then process the transmitted data extracted from the carrier signal. The pulses contain digital bursts of information and accordingly the contents of each pulse may be thought of as a series of binary digits (zeroes or ones). Matched filter means 20 of FIG. 1 may be comprised of a plurality of correlator elements, each correlator element respectively synchronizing one pulse string of frequency $f_x$. Each correlator element is comprised of a shift register for receiving input data and a reference register for evaluating the received input.

Figure 3:
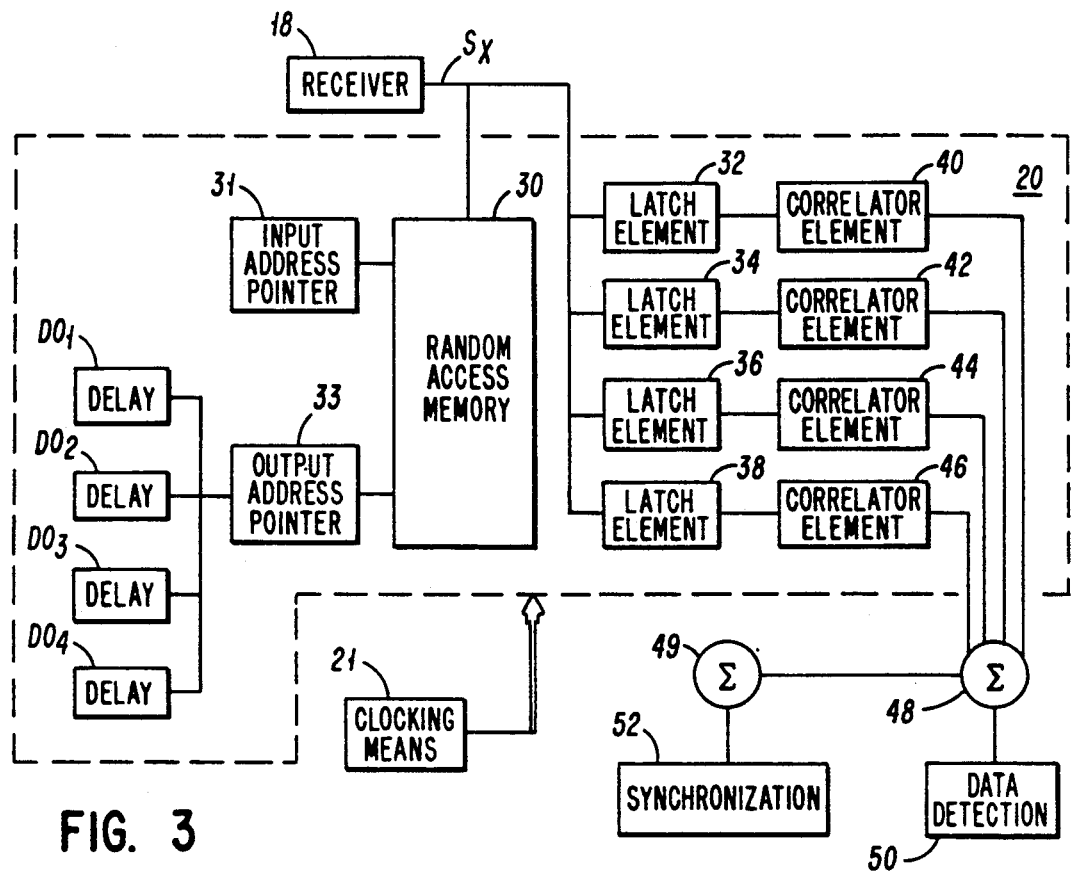
FIG. 3 is a block diagram of one embodiment of a portion of an apparatus incorporating the teachings of the present invention.

FIG. 3 illustrates one embodiment of the matched filter means 20 of FIG. 1. The receiver 18 produces as its output the signal $S_x$. An arbitrarily large, one port RAM means 30 is coupled to the receiver 18 output. The RAM means 30 may be implemented in gate-array (semi-custom) or cell based (full custom) technology and typically results in a silicon saving on the respective die of ten to twenty percent over prior art techniques, depending upon the silicon processing methodologies employed by the manufacturer. The output of receiver 18 is additionally, coupled in parallel through latch elements 32, 34, 36, 38 and correlator elements 40, 42, 44 and 46, respectively. The latch elements may be flip-flop devices (such as "D" type) commonly used for data storage. The correlator elements 40, 42, 44 and 46 are in turn coupled to summing means 48 which in turn is coupled to additional summing means 49. Data detection means 50 and synchronization threshold means 52 are additionally coupled to summing means 48 and 49, respectively. Summing means 49 receives additional input from signals similar to FIG. 3 that are on alternate frequencies (not shown). The RAM means 30 comprises of an address pointer 31 for directing input data and an output address pointer 33 coupled through delay constants $DO_1$ through $DO_4$. It is understood that $DO_1$ through $DO_4$ represent the time constant $K_x$ between the pulses $P_1$ through $P_{16}$, as shown in FIG. 2. Accordingly, the value of $K_x$ may be stored in an appropriate size and number of counter elements, shown as four constants. Clocking means 21 provides desired timing for the above described apparatus.

Figure 4:
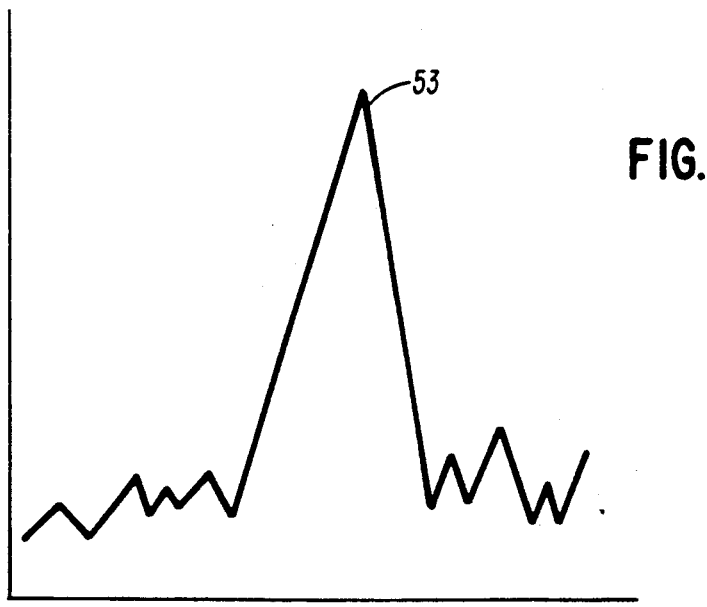
FIG. 4 is a graphical representation of a typical data transmission of FIG. 1.

For any given correlation cycle the use of the RAM means 30 allows for the incremental writing of "m" number of bits of information at one clock instance and subsequent reading of the written data. FIG. 4 illustrates the graphical output of each correlator over time with the peak 53 representing the desired information. By adding the peak values of all delayed pulse data correlations, the summation of the peaks provides synchronization of all pulses and thus enables accurate data extraction.

Figure 5:
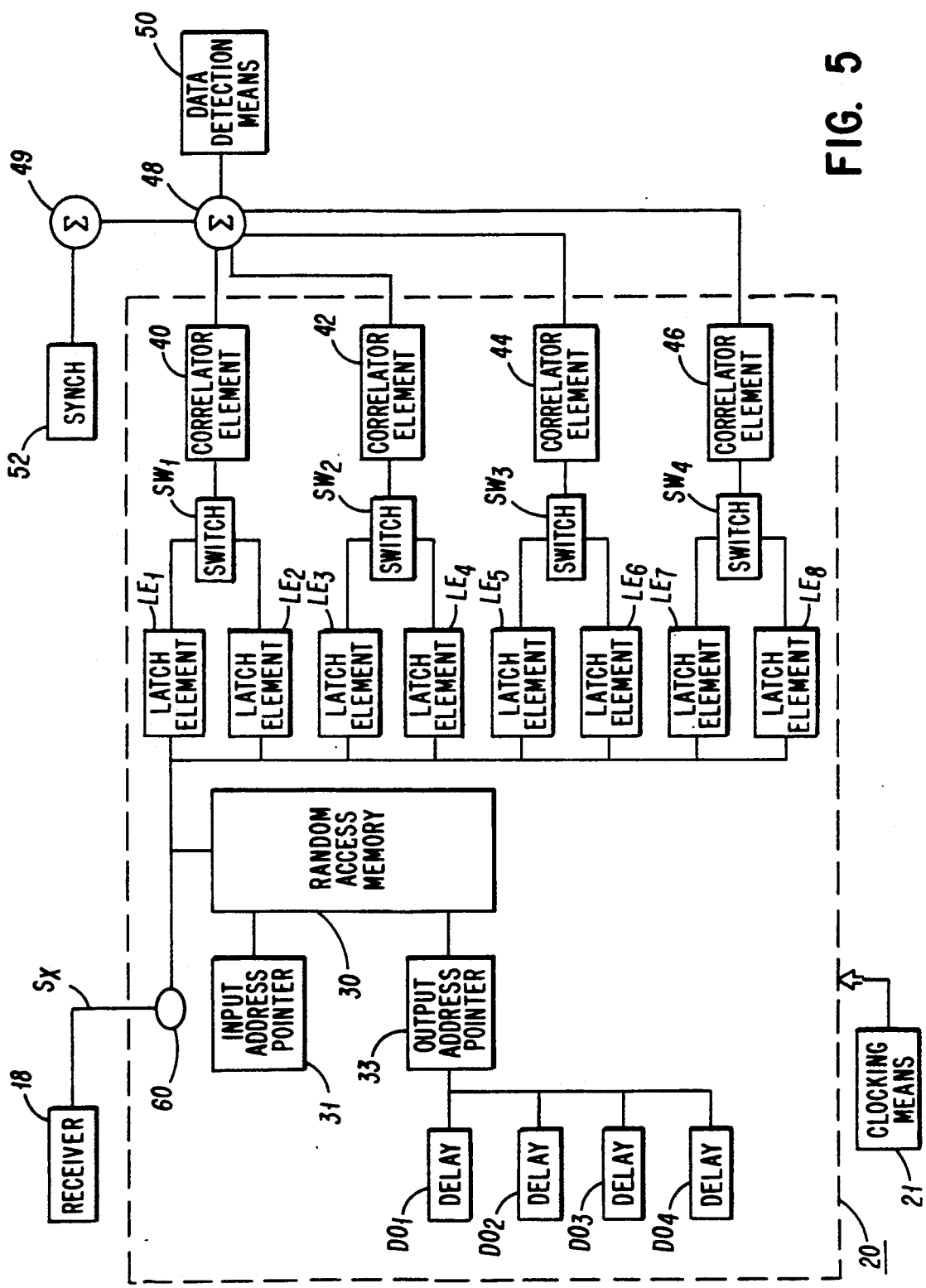
FIG. 5 is a block diagram of a second embodiment of a portion of an apparatus incorporating the teachings of the present invention.

FIG. 5 illustrates an alternate embodiment of the present invention. A multi-bit bus 60, such as an eight bit bus, is included between the output of receiver 18 and the port of the RAM means 30. Correspondingly, paired latch elements $LE_1$ through $LE_8$ and switching means $SW_1$ through $SW_4$ are included in the circuitry prior to the correlator input. The additional elements allow for the writing of a larger number of bits into the RAM means 30 and thus lowers the necessary operating speed of the apparatus. The additional latching componentry allows reading every other data field, thereby trading off speed for agility.

Figure 6:
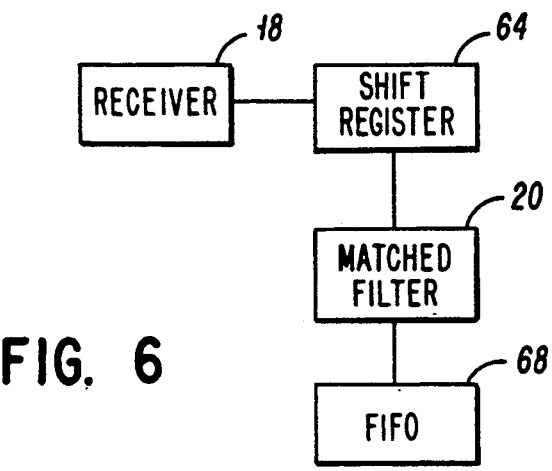
FIG. 6 is a block diagram of single-pulse data extraction portion of the present invention.

FIG. 6 illustrates data extraction using the above described RAM means 30. Once synchronization is accomplished it is also necessary to extract the transmitted data in the signal. A unique aspect of the above described embodiments is the ability of the RAM element 30 in combination with the correlator elements 40, 42, 44 and 46 to extract data. Data extraction is accomplished by alternatively comparing the transmitted signal to all possible states of the reference register of matching filter means 20. A data detector 50 is coupled to the summing means 48 and thereby to RAM means 30. Additional logic means (not shown) is coupled to the data detector FIFO memory element 68 and completes data processing. During delay periods $DO_x$ the information in the reference register and shift register are correlated. The correlation comprises comparing all possible states of the reference data in reference register of matching filter means 20 to the shift register 64 and measuring the peak to sidelobe difference. Maximum peak value 53 of FIG. 4 corresponds to a graphical representation of desired data. Applications in environments of great interference and signals of pulsed data bursts of numerous bits, such as the thirty two bits associated with JTIDS, will result in degradation of received information.

Figure 7:
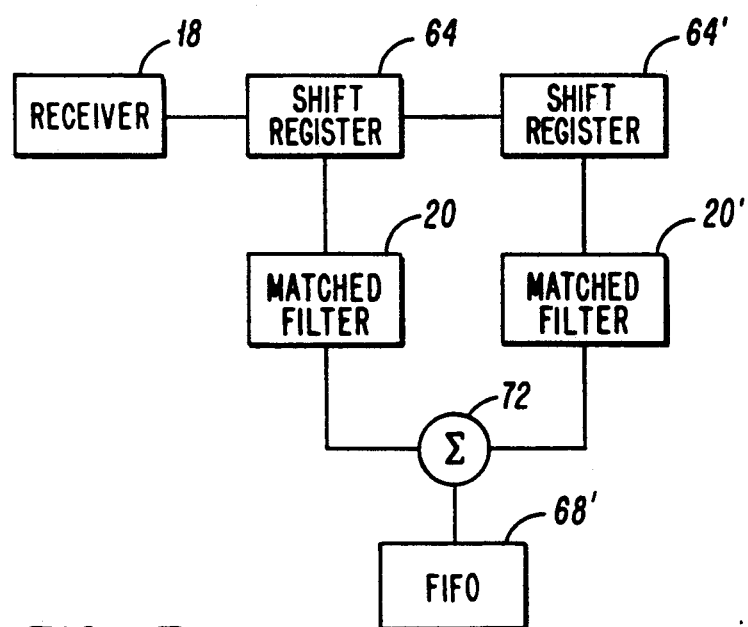
FIG. 7 is a a block diagram of double-pulse data extraction portion of the present invention.

An additional embodiment of data processing provides for double pulse data extraction and is depicted in FIG. 7. This approach minimizes the affects of data degradation by combining results of two measurements thereby minimizing the effects of signal degradation. The initially recorded signal bits in shift register 64 are sequentially moved into a second shift register 64' which is coupled to a correlator element 20'. The output of each correlator 20 and 20' is then coupled to summer means 72 prior to a FIFO memory element 68' and subsequently on to additional logic means (not shown), in this manner enabling a more accurate extraction of transmitted data. This technique is especially useful when signal degradation has occurred.

While particular embodiments of the present invention have been shown and described, it should be clear that changes and modifications may be made to such embodiments without departing from the true scope and spirit of the invention. It is intended that the appended claims will cover all such changes and modifications.

I claim:

1. An apparatus for processing multi-frequency transmitted information received by multi-frequency receiver means comprising:
   temporary storage means for receiving input data and for providing the input data as output data at particular subsequent time delay intervals;
   means for controlling input data and output data with respect to the temporary storage means;
   a plurality of matched filter elements coupled to receiver means for receiving the output data;
   a plurality of latch means for receiving the output data from the temporary storage means and for performing a latching operation of catching data samples and transferring the data samples into said plurality of matched filter means; and
   summing means coupled to the plurality of matched filter means for combining the output of all matched filter means.

2. The apparatus of claim 1 wherein the temporary storage means is a Random Access Memory element of an integrated circuit device.

3. The apparatus of claim 1 implemented on a single integrated circuit device.

4. The apparatus of claim 1 wherein the plurality of matched filter means comprises a plurality of correlator devices each correlator device comprising of a shift register and a reference register.

5. The apparatus of claim 4 wherein four correlators are dedicated to each frequency processed by the receiver.

6. An apparatus for processing multi-frequency transmitted information received and digitized by multi-frequency receiver means comprising:
   a data bus for expanding the instantaneous length of the digitized data output of the receiver means;
   temporary storage means for receiving input data and for providing the input data as output data at particular subsequent time delay intervals;

means for controlling input data and output data with respect to the temporary storage means;

a plurality of matched filter elements coupled to receiver means for receiving the output data;

a plurality of latch means for receiving the output data from the temporary storage means and for performing a latching operation of catching data samples and transferring the data samples into said plurality of matched filter means; and summing means coupled to the plurality of matched filter means for combining the output of all matched filter means.

7. The apparatus of claim 6 wherein the temporary storage means is a Random Access Memory element of an integrated circuit device.

8. The apparatus of claim 6 implemented on a single integrated circuit device.

9. The apparatus of claim 6 wherein the plurality of matched filter means comprises a plurality of correlator devices each correlator device comprising a shift register and a reference register.

10. The apparatus of claim 9 wherein four correlators are dedicated to each frequency processed by the receiver.

* * * * *